(12) United States Patent
Keeling et al.

(10) Patent No.: US 12,422,051 B2
(45) Date of Patent: Sep. 23, 2025

(54) INTERNALLY INSTALLED CHECK VALVE

(71) Applicant: US VALVE CORPORATION, Linthicum Heights, MD (US)

(72) Inventors: Christopher Keeling, Severn, MD (US); Matthew Preston Bowland, Nottingham, MD (US)

(73) Assignee: US VALVE CORPORATION, Linthicum Heights, MD (US)

( * ) Notice: Subject to any disclaimer, the term of this patent is extended or adjusted under 35 U.S.C. 154(b) by 0 days.

(21) Appl. No.: 18/827,215

(22) Filed: Sep. 6, 2024

(65) Prior Publication Data

US 2025/0189048 A1 Jun. 12, 2025

Related U.S. Application Data

(60) Provisional application No. 63/608,603, filed on Dec. 11, 2023.

(51) Int. Cl.
*F16K 15/03* (2006.01)
(52) U.S. Cl.
CPC .................................. *F16K 15/033* (2013.01)
(58) Field of Classification Search
CPC .............................. F16K 15/033; F16K 15/035
See application file for complete search history.

(56) References Cited

U.S. PATENT DOCUMENTS

| | | | |
|---|---|---|---|
| 2,800,920 A | 7/1957 | Smith | |
| 2,956,582 A * | 10/1960 | Pranter | F16K 15/033 |
| | | | 137/527 |
| 3,604,453 A * | 9/1971 | Boitnott | F16K 15/033 |
| | | | 137/527 |
| 3,926,216 A | 12/1975 | Rulcker | |
| 4,694,853 A | 9/1987 | Goodwin | |
| 5,160,118 A | 11/1992 | Stary | |

(Continued)

FOREIGN PATENT DOCUMENTS

| | | |
|---|---|---|
| DE | 102019203904 A1 | 9/2020 |
| EP | 1698813 B1 | 9/2009 |

(Continued)

OTHER PUBLICATIONS

"Flexi-Hinge", Control Devices, LLC, Nov. 16, 2023.

(Continued)

*Primary Examiner* — P. Macade Nichols
(74) *Attorney, Agent, or Firm* — Panitch Schwarze Belisario & Nadel LLP

(57) ABSTRACT

A closure mechanism for a check valve comprises a closure-mechanism body oriented transversely within the valve's flow passage. The mechanism includes first and second plate members supporting seal members for engaging the flow passage. These plate members are movably attached to the closure-mechanism body to move together or apart based on the direction of fluid flow in the valve. Additionally, first and second biased-fixation members are movably positioned within the closure-mechanism body, along with biasing members that urge the first and second biased-fixation members to engage a blind depression in the valve body. This engagement secures the closure mechanism within the flow passage without requiring any additional securing structures.

14 Claims, 8 Drawing Sheets

(56) References Cited

U.S. PATENT DOCUMENTS

| | | | |
|---|---|---|---|
| 5,246,032 A | 9/1993 | Muddiman | |
| 5,301,709 A | 4/1994 | Gasaway | |
| 5,695,116 A | 12/1997 | Karabin | |
| 6,098,656 A | 8/2000 | Farina | |
| 8,201,576 B2 | 6/2012 | Klein | |
| 8,844,563 B2 | 9/2014 | Hawa | |
| 2003/0089404 A1* | 5/2003 | Bodnar | F16K 15/035 137/512.1 |
| 2004/0065370 A1 | 4/2004 | Gallego Buzon | |
| 2007/0256740 A1 | 11/2007 | Sugai et al. | |

FOREIGN PATENT DOCUMENTS

| | | |
|---|---|---|
| EP | 3263960 B1 | 1/2019 |
| WO | 2008126097 A1 | 10/2008 |

OTHER PUBLICATIONS

"Elastomer Hinged Check Valves", Process Development & Control, LLC, Brochure, Nov. 16, 2023.
"Full Port Check Valves", Male NPT, Plan & Grooved End Lowest Pressure Drop, U.S. Valve Brochure, Nov. 16, 2023.
International Serach Report and Written Opinion issued Feb. 3, 2025 in International Application No. PCT/US2024/059159.

* cited by examiner

INTERNALLY INSTALLED CHECK VALVE

CROSS-REFERENCE TO RELATED APPLICATIONS

This application claims the benefit of priority under 35 USC § 119€ of U.S. Provisional Patent Application No. 63/608,603 filed Dec. 11, 2023, the contents of which are incorporated herein by reference.

BACKGROUND OF THE DISCLOSURE

In general, a check valve is a passive device for allowing a fluid such as a liquid, oil, or gas in a fluid system to flow in a forward direction, while preventing reverse flow, which is flow in a direction opposite the forward direction.

One common type of check valve includes a closure mechanism fixed in a flow passage within a valve body. The valve body is generally a segment of pipe or conduit. A closure mechanism for a check valve may be sold in an installed condition in a valve body, or may be sold uninstalled, for later incorporation into a valve body.

The present disclosure relates generally to an internal closure mechanism for a check valve and includes a check valve including the disclosed closure mechanism. More particularly, the present disclosure relates to an improved internal closure mechanism for a check valve, with the closure mechanism being axially fixable without requiring screws, bolts, or other elements engaging or passing through mounting holes that pass through the walls of the valve body. The present disclosure also relates to embodiments of a valve body compatible with the improved internal closure mechanism, and to a complete check valve including both a closure mechanism and a valve body compatible therewith, and to a method of assembling a check valve.

SUMMARY

Briefly stated, a closure mechanism is configured to be fixed within a flow passage of a valve body of a check valve, the closure mechanism including: a closure-mechanism body configured to be oriented transversely with respect to the flow passage; a first-plate member configured to support a first-seal member configured for sealingly engaging the flow passage; a second-plate member configured to support a second-seal member configured for sealingly engaging the flow passage, wherein the first-plate member and the second-plate member are movably attached to the closure-mechanism body so that a first direction of fluid flow in the valve body urges the first-plate member and the second-plate member into an adjacent position to permit fluid flow in the first direction, and a second direction of fluid flow in the valve body opposite the first direction urges the first-plate member and the second-plate member into a spread-apart position to prevent fluid flow in the second direction; a first-biased-fixation member movably positioned at least partially in the closure-mechanism body; a second-biased fixation member movably positioned at least partially in the closure-mechanism body; and at least one biasing member configured to urge the first-biased-fixation member and the second-biased-fixation member outwardly to engage a blind depression disposed on the flow passage of the valve body. The first-biased fixation member and the second-biased fixation member may be sized to engage the blind depression and thereby secure the closure-mechanism body in the flow passage without any additional structure securing the first-biased-fixation member and the second-biased-fixation member in the blind depression.

In any embodiment of the closure mechanism, the first-biased-fixation member may include a first pin; and the second-biased-fixation member may include a second pin.

In any embodiment of the closure mechanism, the biasing member may include at least one of a coil spring, a cylinder filled with compressed gas, or opposing poles of magnets placed in proximity to create a repelling force therebetween.

In any embodiment of the closure mechanism including the first pin and the second pin, the first pin, the second pin and the at least one biasing member may be arranged in a pin channel of the body.

In any embodiment of the closure mechanism, the blind depression may include a blind hole.

In any embodiment of the closure mechanism, the blind depression may include a groove. The groove may form a circumferential channel extending completely around the flow passage.

In another aspect, a method for fixing a closure mechanism within a flow passage of a valve body of a check valve may consist essentially of: inserting, into the flow passage of the valve body of the check valve, a closure mechanism according to claim 1, with the closure-mechanism body oriented transversely with respect to the flow passage; and sliding the closure mechanism toward the blind depression disposed on the flow passage of the valve body until the first-biased-fixation member and the second-biased-fixation member engage the blind depression under a force of the at least one biasing member and thereby secure the closure-mechanism body in the flow passage, without employing any additional structure to secure the first-biased-fixation member and the second-biased-fixation member in the blind depression.

In any embodiment of the method, the first-biased-fixation member may include a first pin; and the second-biased-fixation member may include a second pin.

In any embodiment of the method, the at least one biasing member may include at least one of a coil spring, a cylinder filled with compressed gas, or opposing poles of magnets placed in proximity to create a repelling force therebetween.

In any embodiment of the method, the first pin, the second pin, and the at least one biasing member may be arranged in a pin channel of the body.

In any embodiment of the method, the blind depression may include a blind hole.

In any embodiment of the method, the blind depression may include a groove.

In any embodiment of the method, the groove may form a circumferential channel extending completely around the flow passage.

BRIEF DESCRIPTION OF THE SEVERAL VIEWS OF THE DRAWINGS

The foregoing summary, as well as the following detailed description of a preferred embodiment of the check valve and closure mechanism, will be better understood when read in conjunction with the appended drawings. For the purposes of illustrating the system and method, there is shown in the drawings one or more presently preferred embodiments thereof. It should be understood, however, that the application is not limited to the precise arrangements and instrumentalities shown. In the drawings.

DETAILED DESCRIPTION OF THE INVENTION

Figure 1:
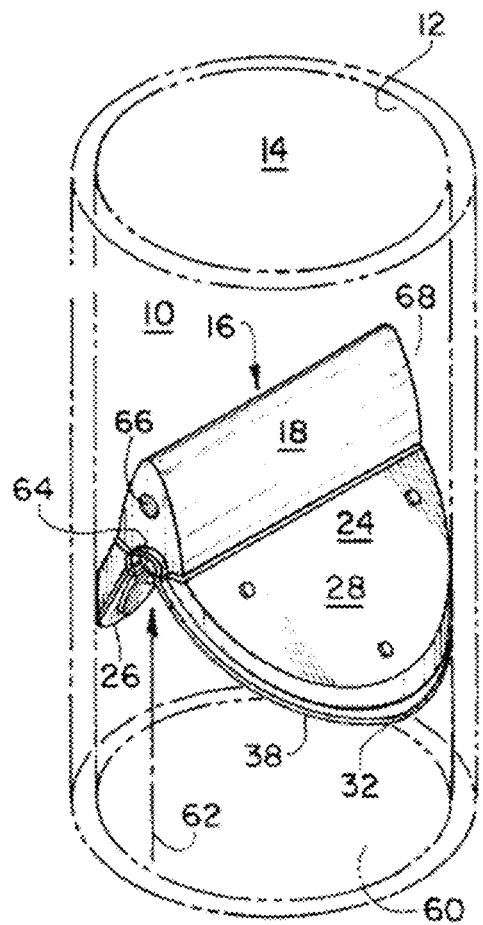
FIG. 1 is a longitudinal, perspective view of a check valve and closure mechanism as shown in U.S. Pat. No. 6,098,656 of the prior art.

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of an object and designated parts thereof. Unless specifically set forth otherwise herein, the terms "a," "an," and "the" are not limited to one element but instead should be read as meaning "at least one." "At least one" may occasionally be used for clarity or readability, but such use does not change the interpretation of "a," "an," and "the." Moreover, the singular includes the plural, and vice versa, unless the context clearly indicates otherwise. As used herein, the terms "proximal" and "distal" are relative terms referring to locations or elements that are closer to (proximal) or farther from (distal) with respect to other elements, the user, or designated locations. "Including" as used herein means "including but not limited to." The word "or" is inclusive, so that "A or B" encompasses A and B, A only, and B only. The terms "about," "approximately," "generally," "substantially," and like terms used herein, when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit thereof. The terminology set forth in this paragraph includes the words noted above, derivatives thereof, and words of similar import.

Figure 2:
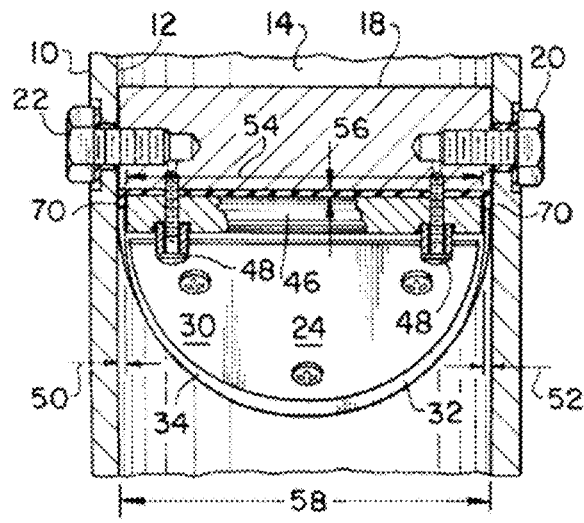
FIG. 2 is a longitudinal, sectional view of the check valve and closure mechanism of FIG. 1 as shown in the prior art, with screws 20, 22 passing through the pipe 10 to secure the closure mechanism axially to the valve body.

As context for the present disclosure, U.S. Pat. No. 6,098,656, of which Applicant is the assignee of record, is summarized below and is incorporated by reference in its entirety. Referring to FIGS. 1 and 2 of the present application, which are excerpted from U.S. Pat. No. 6,098,656, the prior art describes the general arrangement of the closure mechanism for one example of a check valve as follows:

To permit fluid flow through, and also to effectuate shut-off thereof, in relation to a hollow pipe 10 having an inner circular surface 12 bounding the flow passage 14, use is commonly made of a check valve, [of which the closure mechanism is] generally designated 16 [.] . . . [A] s is generally known, [the closure mechanism 16] is constructed with a cavitation-minimizing aerodynamically shaped nose or body 18 oriented in a diametrical relation, as best shown in FIG. 2, in the noted flow passage and connected by screws 20 and 22 at installation sites coinciding with the screws 20 and 22, which sites are to be understood to be also designated 20 and 22. Construction [-] wise, check valve [closure mechanism] 16 is completed with two identical semicircular valve members 24 and 26 which are mounted in depending relation from the body 18, each valve member 24, 26 having an outer and inner plate 28 and 30 between which there is disposed in an interposed position a shape-matching seal 32 of rubber or like elastomeric construction material so as to better serve a fluid-sealing function, the dimension size of the seal 32 being slightly in excess of that of the valve members 24, 26 so that an elliptically shaped edge of the seal 32, as at 34, extends beyond the periphery of the valve members 24, 26 which provides a fluid tight seal, . . . when the valve members 24, 26 are urged from their adjacent positions into their spread-apart positions following pivotal traverses in response to pressure exerted against the valve members 24, 26 by fluid flowing in an ascending direction in the flow passage 14.

Figure 3:
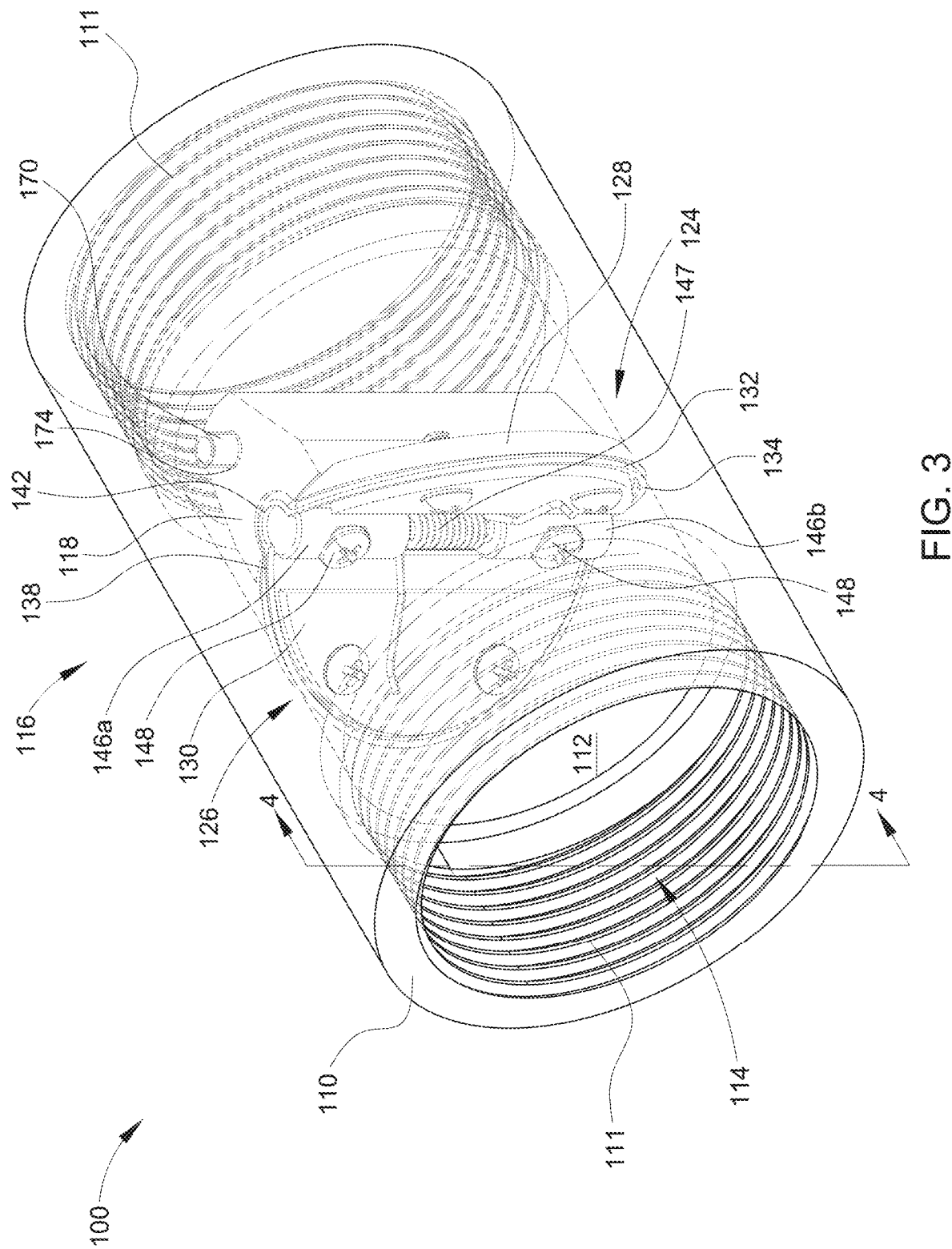
FIG. 3 is a longitudinal, perspective view of a first embodiment of a check valve and closure mechanism according to the present disclosure.

U.S. Pat. No. 6,098,656 col. 1, line 48-col. 2, line 8. U.S. Pat. No. 6,098,656 continues, "Seal 32, in between the shapes 38 [and an opposite counterpart shape, not shown in the excerpted figures], . . . matching that of the valve members 24, 26, has an additional or third shape of an inverted U-configuration which bounds a mounting pin-receiving compartment, said third seal shape . . . being looped over a mounting pin 46 so as to be in an interposed position in the compartment . . . when the mounting pin 46, centered in the compartment . . . , is attached by screws, individually and collectively designated 48 to the body 18." Id., col. 2, lines 8-16. Moreover, the prior art describes "provision of a recess 50 and 52 at each opposite end of the mounting pin 46 . . . by selecting a lengthwise dimension 54 of the pin 46 which is approximately just less than twice the thickness 56 of the seal 32 relative to the body lengthwise dimension so that in the centered position of the mounting pin 46 each end thereof is correspondingly approximately a single thickness 56 short of the body's lengthwise dimension." Id., col. 2, lines 17-25. The closure mechanism 16 is disclosed as being installed by being urged along a path of movement 62 and then fixed in place at installment sites 20 and 22 by way of screws 20, 22, which pass through pipe from the exterior thereof to engage threaded drilled openings 66, 68 in the body 18. Id., col. 2, lines 17-36. The check valve disclosed is a particular configuration in which the valve members 24 and 26 are linked by the seal 32, which is an elastic member and forms the connection between the valve members 24 and 26. In contrast, many prior check valves have valve members employing solid connection elements that connect each valve member to a shaft (often a common shaft) for rotation about the shaft. Many such prior check valves include a central rib or a seat to contact and support the valve members in the closed position. For example, in U.S. Pat. No. 8,844,563 to Hawa, FIGS. 2 and 3 show, and col. 2, lines 2-38 describe valve elements in the form of flappers 4 pivotably mounted by bosses 18 on a hinge pin 7, with a seat 13 and a web 14 provided in the valve bore 12. The seat 13 and the web 14 are configured to contact and support the flappers 4 in the closed position. The hinge pin 7, the seat 13, and the web 14 are absent from the disclosure of U.S. Pat. No. 6,098,656 and the examples included in the present disclosure. The hinge pin 7 is absent from the device of the disclosure of U.S. Pat. No. 6,098,656 and the examples included in the present disclosure because the valve members 24 and 26 do not pivot directly on a hinge pin in the examples included in the present disclosure.

Figure 7:
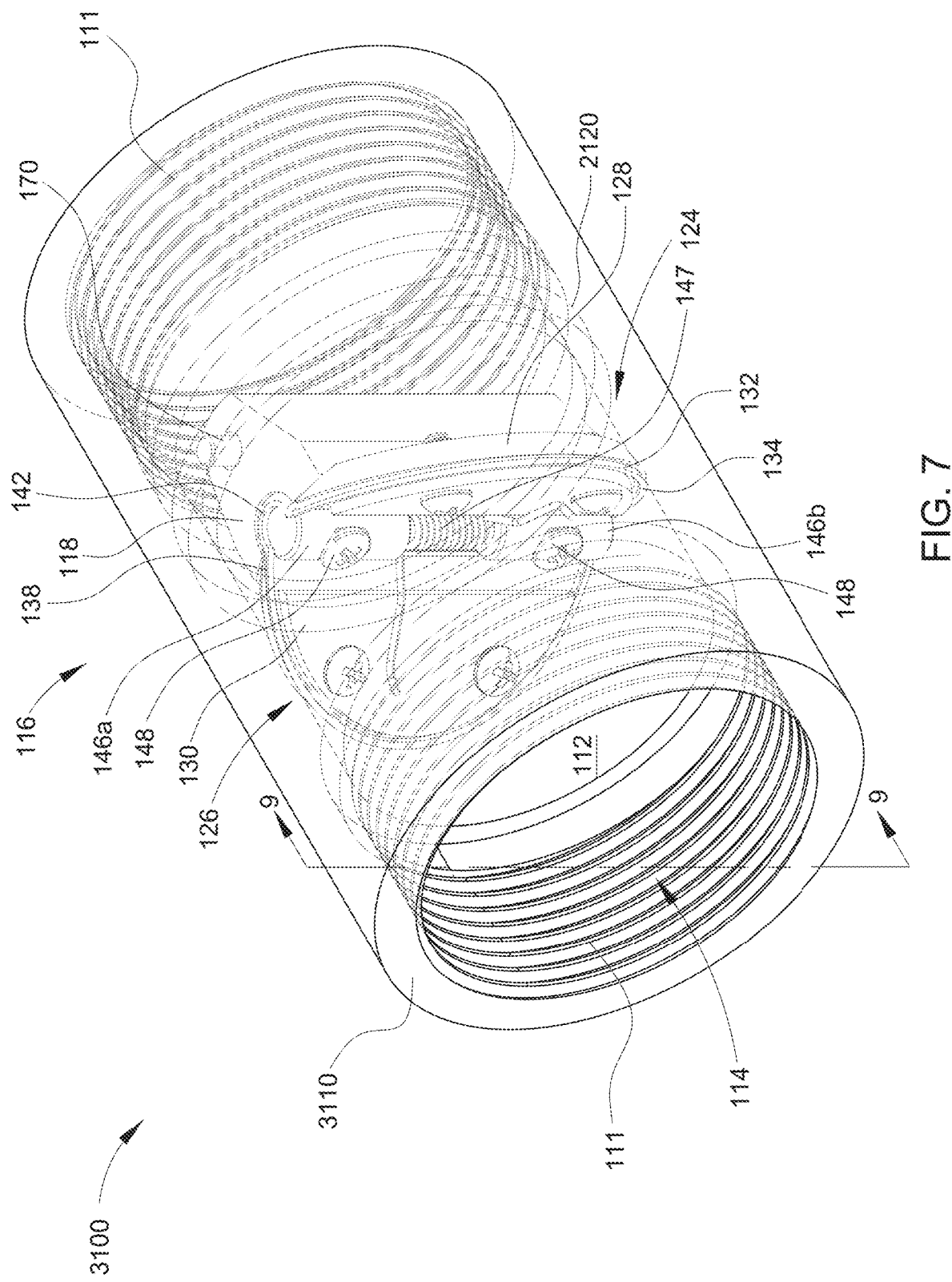
FIG. 7 is a longitudinal, perspective view of a fourth embodiment of a check valve and closure mechanism according to the present disclosure.
Figure 8:
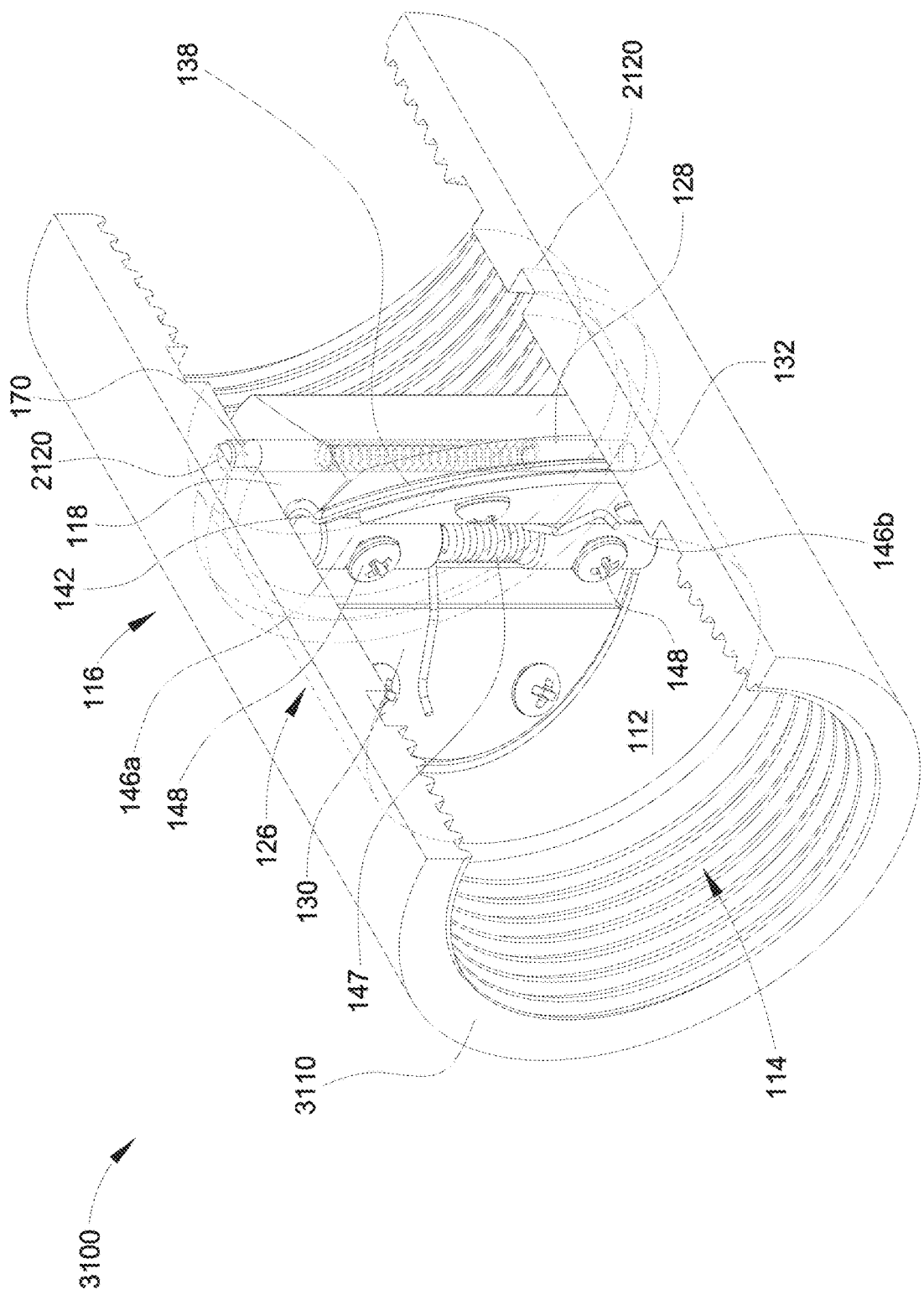
FIG. 8 is a longitudinal, perspective, cutaway view of the check valve and closure mechanism of FIG. 7.
Figure 9:
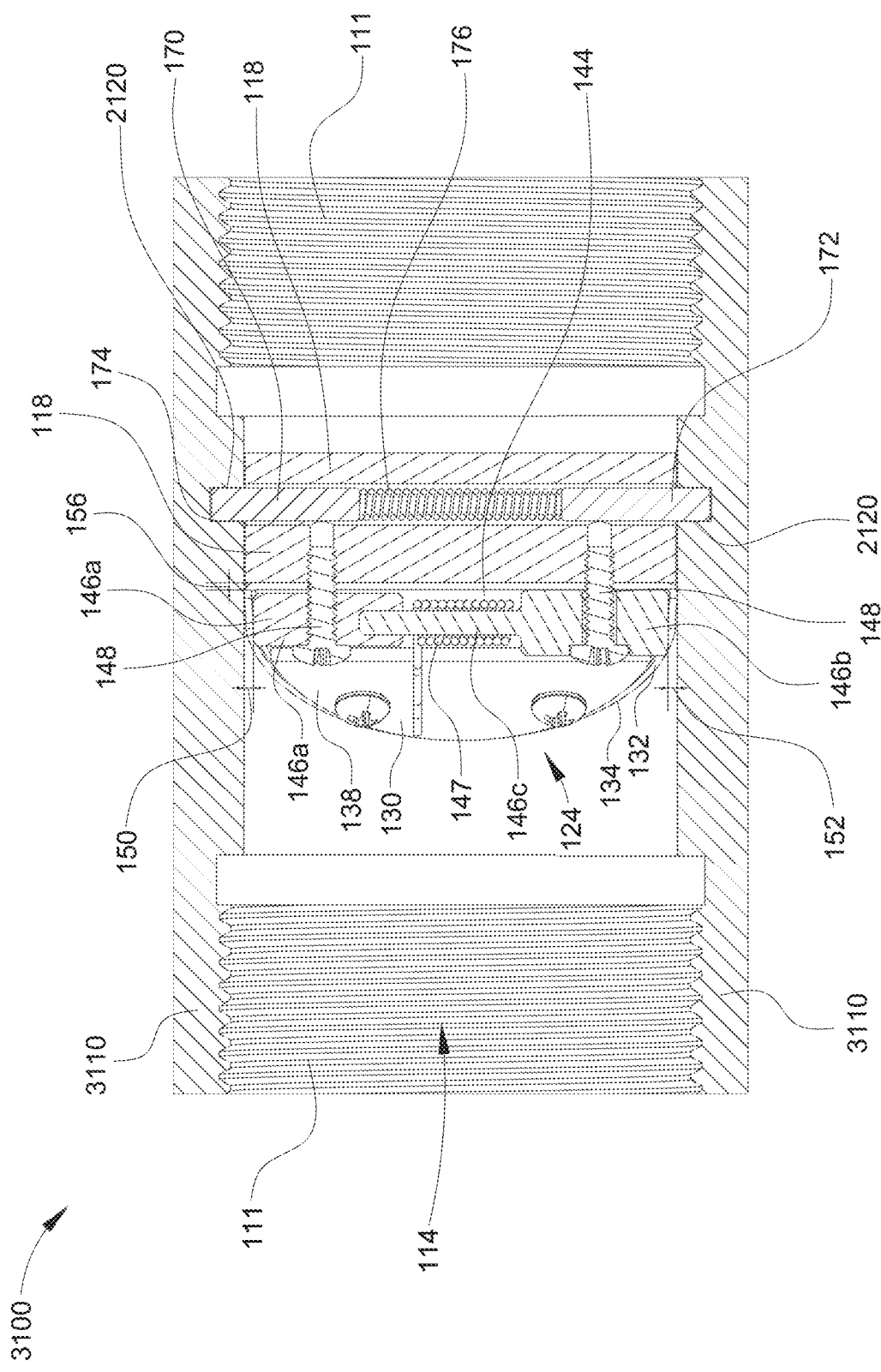
FIG. 9 is a longitudinal, sectional view of the check valve and closure mechanism of FIG. 7, taken along section line 9-9.

The present disclosure, referring to FIGS. 3-9, is directed to a closure mechanism 116 for a first embodiment of a check valve 100 (FIGS. 3-4), a second embodiment of a check valve 1100 (FIG. 5), a third embodiment of a check valve (FIG. 6), and a fourth embodiment of a check valve 3100 (FIGS. 7-9). The check valves differ in aspects of a valve body or pipe 110, 1110, 2110, 3110 incorporated into each embodiment. The check valves 100, 1100, 2100, 3100 have the same general arrangement discussed above with respect to FIGS. 1 and 2. The closure mechanism 116 and check valve 100, 1100, 2100, 3100 of the present disclosure, however, differ from that of FIGS. 1 and 2 in providing a different structure for securing the closure mechanism 116 within the valve body, which takes the form of a pipe 110, 1110, 2110, 3110. Various components of the presently disclosed closure mechanism 116 and check valve 100, 1100, 2100, 3100 are similar or substantially identical to components disclosed in U.S. Pat. No. 6,098,656 and disclosed above; similar components are given reference numerals increased by 100 from the reference numerals used for similar components in the disclosure of U.S. Pat. No. 6,098,656 excerpted above.

Referring to FIGS. 3-9, the general arrangement of the closure mechanism 116 for the check valve 100, 1100, 2100, 3100 is as follows. The check valve 100, 1100, 2100, 3100 includes the closure mechanism 116 configured to be fixed in a flow passage 114 within a valve body formed by a pipe 110, 1110, 2110, 3110. The closure mechanism 116 is configured to permit fluid flow through the check valve 100, 1100, 2100, 3100 and to effectuate shut-off thereof. The valve body or pipe 110, 1110, 2110, 3110 may have an inner cylindrical surface 112 (essentially circular in cross section) bounding the flow passage 114.

The closure mechanism 116 is constructed with a cavitation-reducing and aerodynamically shaped nose or closure-mechanism body 118 oriented transversely with respect to the pipe 110, 1110, 2110, 3110 and the flow passage 114. The pipe 110, 1110, 2110, 3110 in each embodiment is shown in each of FIGS. 3 and 5-7, as being transparent to allow a better view of the closure mechanism 116. In the first embodiment and the fourth embodiment of the check valve 100, 3100, referring to FIGS. 3-4 and 7-9, the pipe 110, 3110 has end threading 111 to allow for connection to compatible threaded pipes for installation of the check valve 100, 3100. In the second and third embodiments of the check valve 1100, 2100, referring to FIGS. 5-6, the closure mechanism 116 is installed in a pipe 1110, 2110 lacking end threading. In the second and third embodiments of FIGS. 5-6, the pipe 1110, 2110 is fixed in a selected fluid line by welding, adhesives, or other known measures for attaching unthreaded piping components to one another.

In the embodiments of FIGS. 3-9, the closure mechanism 116 includes two substantially identical semi-circular valve members 124 and 126, each mounted in depending relation from the closure-mechanism body 118. Each valve member 124, 126 has an outer plate 128 and an inner plate 130, with a shape-matching seal 132 of rubber or like elastomeric construction material disposed between the outer plate 128 and the inner plate 130. Each outer plate 128 and each inner plate 130 may serve as a first-plate member configured to support a first-seal member configured for sealingly engaging the flow passage, or as a second-plate member configured to support a second-seal member configured for sealingly engaging the flow passage. The first-seal member and the second-seal member may include portions of a single seal member (such as opposite-side portions thereof), such as a shape-matching seal 132 of rubber or like elastomeric construction material disposed between the outer plate 128 and the inner plate 130, as shown. The first-plate member and the second-plate member are movably attached to the closure-mechanism body 118 so that a first direction of fluid flow in the valve body or pipe 110, 1110, 2110, 3110 urges the first-plate member and the second-plate member into an adjacent position to permit fluid flow in the first direction, and a second direction of fluid flow in the valve body or pipe 110, 1110, 2110, 3110 opposite the first direction urges the first-plate member and the second-plate member into a spread-apart position to prevent fluid flow in the second direction. The seal 132 is slightly larger (radially or generally radially) than the valve members 124, 126, so that an elliptically shaped edge of the seal 132, as at location 134, extends beyond the periphery of the valve members 124, 126 to provide a fluid-tight seal against the inner circular surface 112 of the pipe 110, 1110, 2110, 3110. The fluid-tight seal is provided when the valve members 124, 126 are urged from an adjacent position (permitting forward fluid flow) to a spread-apart position (preventing reverse fluid flow) in response to pressure exerted against the valve members 124, 126 by fluid flowing in the flow passage 114.

Figure 4:
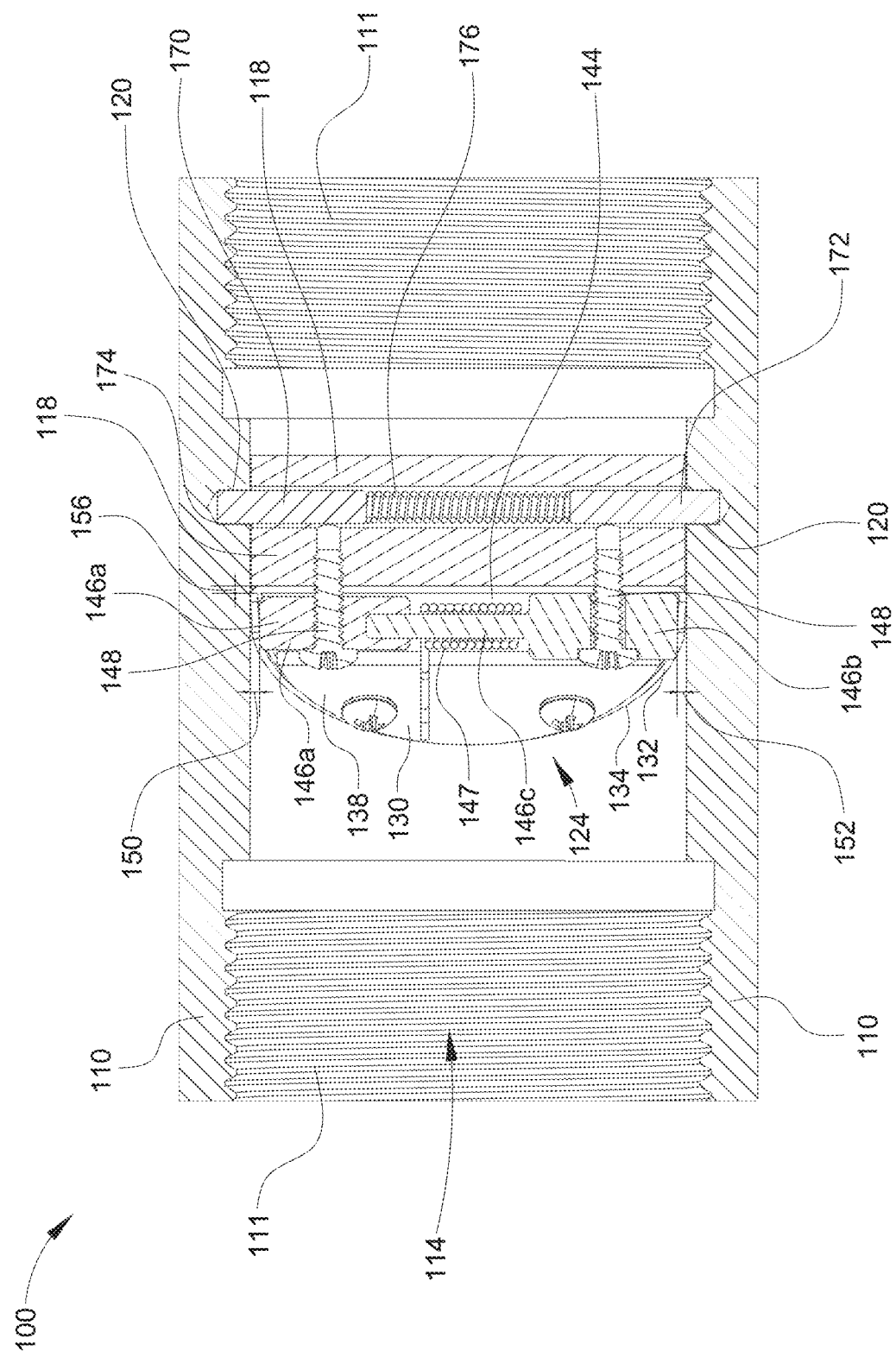
FIG. 4 is a longitudinal, sectional view of the check valve and closure mechanism of FIG. 3, taken along section line 4-4.
Figure 5:
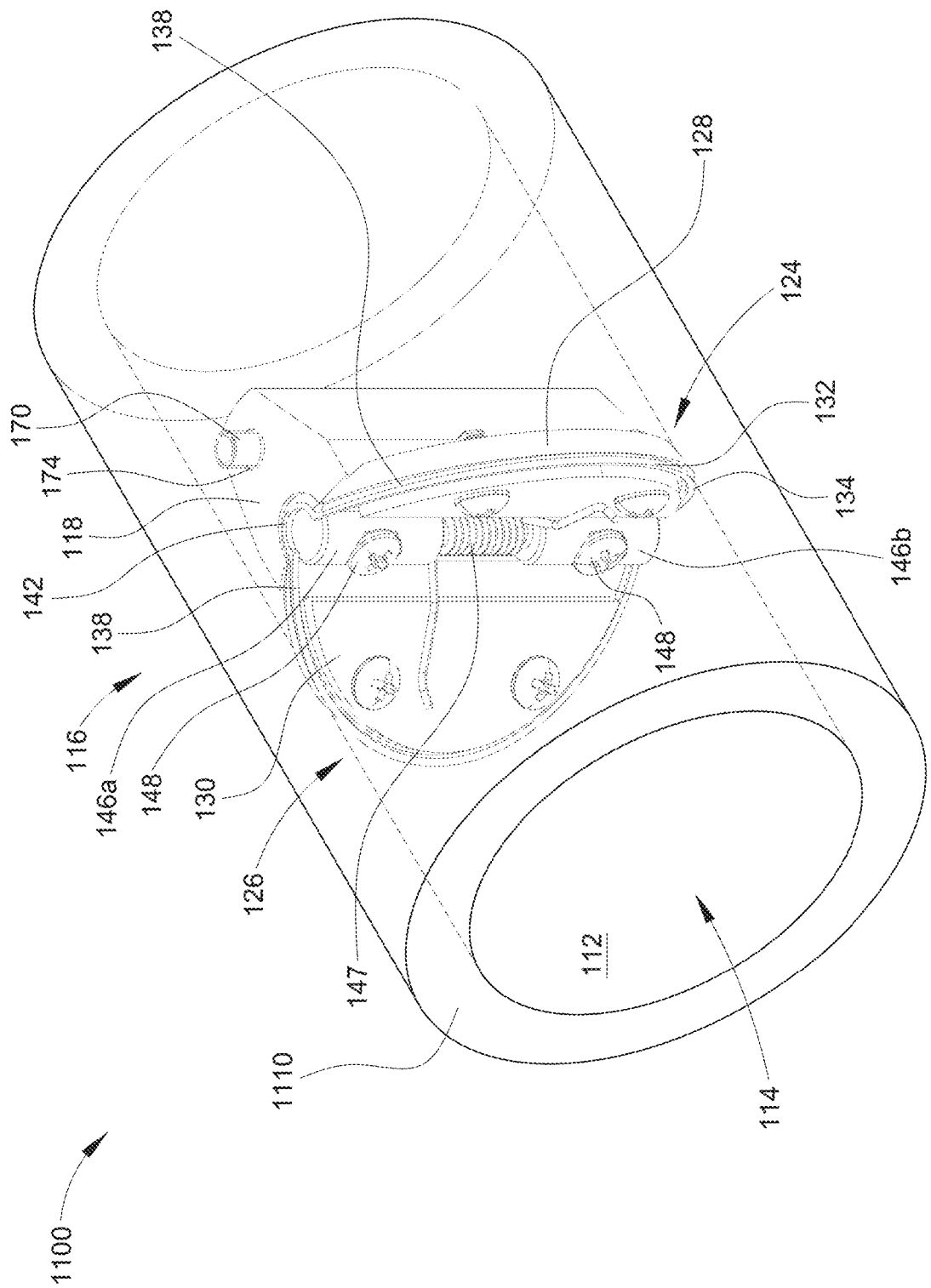
FIG. 5 a longitudinal, perspective view of a second embodiment of a check valve and closure mechanism according to the present disclosure.
Figure 6:
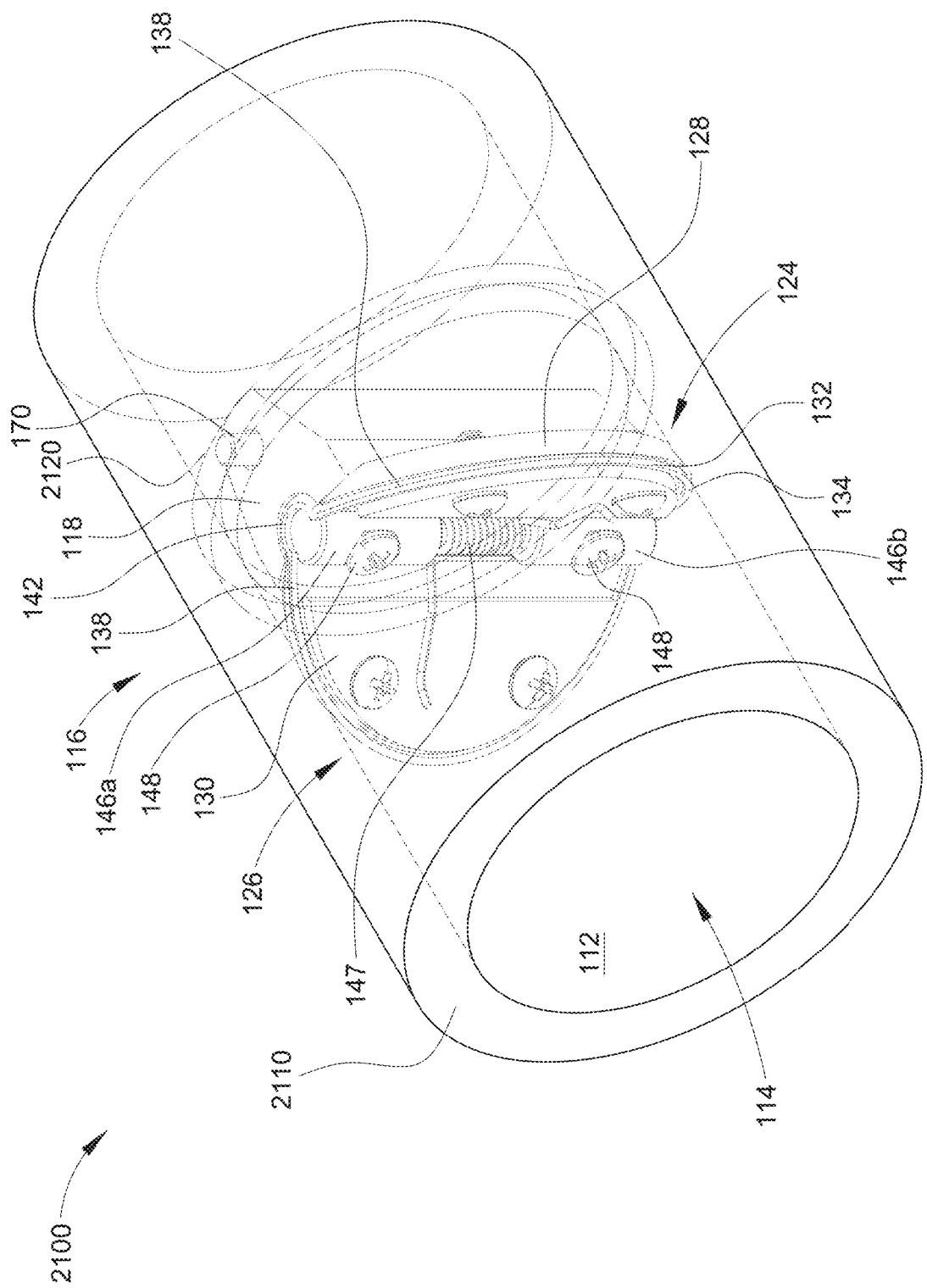
FIG. 6 is a longitudinal, perspective view of a third embodiment of a check valve and closure mechanism according to the present disclosure.

The seal 132 may be disposed between the shape 138 and an opposite counterpart shape matching that of the valve members 124, 126. The seal 132 may be formed in a flat configuration and may then flex when installed to form an additional or third shape 142 of an inverted U-configuration which bounds a mounting-pin-receiving compartment 144 (FIG. 4), the third seal shape 142 being looped over a mounting pin. As seen in FIG. 4, the mounting pin may be formed by a first portion 146a and a second portion 146b, which may include a narrowed intermediate portion 146c for supporting a biasing member in the form of a torsion spring 147. In the illustrated embodiment, the seal 132 and the shape 138 thereof are in an interposed position in the compartment 144 when the mounting pin is centered in the compartment 144. The mounting pin is attached to the closure-mechanism body 118 by screws 148. A first recess 150 and a second recess 152 are provided at each opposite end of the mounting pin by selecting a lengthwise dimension of the mounting pin, the lengthwise dimension being just less than twice the thickness 156 of the seal 132 relative to the body lengthwise dimension. As a result, in a centered position of the mounting pin, each end thereof is correspondingly approximately a single thickness 156 short of the body's lengthwise dimension. When inserted into the closure-mechanism body 118, the seal 132 may fold against the closure-mechanism body 118, forcing the seal 132 tight against the closure-mechanism body 118 and creating the internal seal of the check valve 100 at the upper and lower limits thereof.

The present disclosure includes a method for fixing a closure mechanism 116 within a flow passage 114 of a valve body of a check valve 100, 1100, 2100, 3100, with the valve body being formed by, for example, a pipe 110, 1110, 2110, 3110. The method may include or may consist essentially of inserting, into the flow passage 114 of the valve body or pipe 110, 1110, 2110, 3110 of the check valve 100, 1100, 2100, 3100, a closure mechanism 116 as disclosed above, with the closure-mechanism body 118 oriented transversely with respect to the flow passage 114. The closure mechanism 116 may be installed by urging the closure mechanism 116 along a path of movement parallel to the flow passage 114 and then fixed in place via a first-biased fixation member and a second-biased fixation member. The method may include or consist essentially of sliding the closure mechanism 116 toward the blind depression (blind hole 120 or groove 2120) disposed on the inner surface 112 of the flow passage 114 of the valve body until the first-biased-fixation member and the second-biased-fixation member engage the blind depression under a force of the at least one biasing member and thereby secure the closure-mechanism body in the flow passage, without employing any additional structure to secure the first-biased-fixation member and the second-biased-fixation member in the blind depression. The first-biased fixation member and the second-biased fixation member may take the form of a first pin 170 and a second pin 172, which may be movably positioned at least partially in the closure-mechanism body 118, such as by the first pin 170, second pin 172, and at least one coil spring 176 being housed or arranged in a suitable opening such as a pin channel 174 of the closure-mechanism body 118. The first pin 170 and the second pin 172 may be biased apart from one another by a biasing member such as a coil spring 176 or other biasing member, such as a cylinder filled with pressurized gas, opposing poles of magnets, or another suitable device capable of biasing the first pin 170 and the second pin 172 to move radially outwardly with respect to the closure-mechanism body 118, preferably to protrude therefrom.

The first pin 170 and the second pin 172 are configured and positioned by the pin channel 174 and the coil spring 176 or other biasing member to engage a blind depression—for example, a blind hole 120, of which two are shown, or a groove 2120—at two or more locations on the inner surface of the pipe 110, 1110, 2110, 3110, with the result that the closure-mechanism body 118 is secured against axial movement within the pipe 110, 1110, 2110, 3110 once the first pin 170 and the second pin 172 are engaged with the holes 120, the groove 2120, or other blind depression. As best seen in FIG. 4, the first pin 170 and the second pin 172 engage the blind holes 120 on the inner surface 112 of the pipe 110. As an aid to installation, the first pin 170 and the second pin 172 may each have a tapered external end. As best seen in FIGS. 8-9, the first pin 170 and the second pin 172 engage the groove 2120 on the inner surface 112 of the pipe 110. The first pin 170 and the second pin 172 may each have a tapered external end (not shown).

The holes 120, the groove 2120, or other blind depression are sized to engage one or both of the first pin 170 and the second pin 172 so that once the first pin 170 or the second pin 172 is inserted into and engaged by a hole 120 or groove 2120, the first pin 170 or the second pin 172 is not removable from the hole 120 or the groove 2120, other than by exceeding strength limits and causing failure of the closure mechanism 116 or the pipe 2110, 3110 or the inner surface 112 thereof. The first-biased-fixation member or first pin 170 and the second-biased-fixation member or second pin 172 are sized to engage the blind depression and thereby secure the closure-mechanism body 118 in the flow passage 114 without any additional structure securing the first-biased-fixation member or first pin 170 and the second-biased-fixation member or second pin 172 in the blind depression. The blind depression or blind depressions preferably are transversely spaced from one another and may preferably, as in the illustrated embodiment, be located to be essentially coplanar with one another on diametrically opposite sides of the flow passage 114, as are blind holes 120 in the illustrated embodiments. Alternatively, a blind depression may be a groove 2120 having a width substantially matching a diameter of the first pin 170 and/or the second pin 172 and circumscribing about 180 degrees or more of the inner surface 112 (up to and including a groove completely encircling the inner surface 112), so that the first pin 170 and the second pin 172 may be located with the groove 2120 at locations transversely opposite or essentially opposite one another on the inner surface 112 of the pipe 2110, 3110, as shown in FIGS. 6-9. Alternatively, two grooves may be positioned transversely opposite one another; such grooves may function to provides a bit more play upon installation than a blind hole 120 substantially matching the diameter of the first pin 170 and the second pin 172. In any particular configuration of a blind depression, the blind depression does not fully penetrate the pipe 110, 1110, 2110, 3110 and as a result does not create a leakage path between the flow passage 114 and the space exterior of the pipe 110, 1110, 2110, 3110.

The disclosed check valve and closure mechanism may be employed to eliminate all leakage points in the check valve 100, 1100, 2100, 3100 between the interior passage 114 and the space external to the pipe 110, 1110, 2110, 3110. The lack of leakage points eliminates the need for sealing of such leakage points and other measures. The lack of leakage points also eliminates the need for leakage testing on each check valve upon installation of the closure mechanism and re-work when a leak is detected. The elimination of external leakage paths also renders the closure mechanism and check valve safer for service with fluids such as explosive gases and corrosive liquids, as well as installations in or near critical or sensitive equipment such as fuel cells, computer installations, and the like.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure.

We claim:

1. A closure mechanism configured to be fixed within a flow passage of a valve body of a check valve, the closure mechanism comprising:
   a closure-mechanism body configured to be oriented transversely with respect to the flow passage;
   a first-plate member configured to support a first-seal member configured for sealingly engaging the flow passage;
   a second-plate member configured to support a second-seal member configured for sealingly engaging the flow passage,
   wherein the first-plate member and the second-plate member are movably attached to the closure-mechanism body so that a first direction of fluid flow in the valve body urges the first-plate member and the second-plate member into an adjacent position to permit fluid flow in the first direction, and a second direction of fluid flow in the valve body opposite the first direction urges the first-plate member and the second-plate member into a spread-apart position to prevent fluid flow in the second direction;
   a first-biased-fixation member movably positioned at least partially in the closure-mechanism body;

a second-biased-fixation member movably positioned at least partially in the closure-mechanism body; and at least one biasing member configured to urge the first-biased-fixation member and the second-biased-fixation member outwardly to engage a blind depression disposed on the flow passage of the valve body, wherein the first-biased-fixation member and the second-biased-fixation member are sized to engage the blind depression and thereby secure the closure-mechanism body in the flow passage without any additional structure securing the first-biased-fixation member and the second-biased-fixation member in the blind depression.

2. The closure mechanism of claim 1, wherein:
the first-biased-fixation member comprises a first pin; and
the second-biased-fixation member comprises a second pin.

3. The closure mechanism of claim 2, wherein the biasing member comprises a coil spring.

4. The closure mechanism of claim 2, wherein the first pin, the second pin and the at least one biasing member are arranged in a pin channel of the body.

5. The closure mechanism of claim 1, wherein the blind depression comprises a blind hole.

6. The closure mechanism of claim 1, wherein the blind depression comprises a groove.

7. The closure mechanism of claim 6, wherein the groove forms a circumferential channel extending completely around the flow passage.

8. A method for fixing a closure mechanism within a flow passage of a valve body of a check valve, the method consisting essentially of:

inserting, into the flow passage of the valve body of the check valve, a closure mechanism according to claim 1, with the closure-mechanism body oriented transversely with respect to the flow passage; and sliding the closure mechanism toward the blind depression disposed on an inner surface of the flow passage of the valve body until the first-biased-fixation member and the second-biased-fixation member engage the blind depression under a force of the at least one biasing member and thereby secure the closure-mechanism body in the flow passage, without employing any additional structure to secure the first-biased-fixation member and the second-biased-fixation member in the blind depression.

9. The method of claim 8, wherein:
the first-biased-fixation member comprises a first pin; and
the second-biased-fixation member comprises a second pin.

10. The method of claim 9, wherein the at least one biasing member comprises a coil spring.

11. The method of claim 9, wherein the first pin, the second pin and the at least one biasing member are arranged in a pin channel of the body.

12. The method of claim 8, wherein the blind depression comprises a blind hole.

13. The method of claim 8, wherein the blind depression comprises a groove.

14. The method of claim 13, wherein the groove forms a circumferential channel extending completely around the flow passage.

* * * * *